United States Patent
Gross et al.

(10) Patent No.: US 12,441,542 B2
(45) Date of Patent: Oct. 14, 2025

(54) DRUG PICKING DEVICE

(71) Applicant: Becton Dickinson Rowa Germany GmbH, Kelberg (DE)

(72) Inventors: Dietmar Gross, Kelberg (DE); Heinrich Paul Martini, Brachtendorf (DE); Markus Gerten, Trier (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 906 days.

(21) Appl. No.: 17/678,582

(22) Filed: Feb. 23, 2022

(65) Prior Publication Data
US 2023/0264896 A1    Aug. 24, 2023

(51) Int. Cl.
*B65G 1/10*       (2006.01)
*B65G 1/137*      (2006.01)

(52) U.S. Cl.
CPC ............. *B65G 1/1371* (2013.01); *B65G 1/10* (2013.01)

(58) Field of Classification Search
CPC .......... B65G 1/1371; B65G 1/10; B65G 1/02; G07F 11/46; G07F 17/0092
See application file for complete search history.

(56) References Cited

U.S. PATENT DOCUMENTS

| | | | | |
|---|---|---|---|---|
| 2,510,243 A | * | 6/1950 | Mohring | A47B 47/04 108/92 |
| 5,295,446 A | * | 3/1994 | Schafer | B65G 1/02 211/187 |
| 5,588,541 A | * | 12/1996 | Goetz | A47B 87/008 211/186 |
| 2006/0232174 A1 | * | 10/2006 | Muth | A47B 53/02 312/198 |
| 2011/0115352 A1 | * | 5/2011 | Hohl | A47B 87/0215 211/134 |

FOREIGN PATENT DOCUMENTS

| | | | | |
|---|---|---|---|---|
| CN | 106081451 A | * | 11/2016 | ........... B65G 1/0485 |
| CN | 106081451 B | | 12/2018 | |
| DE | 8607682 U1 | | 4/1986 | |
| WO | WO-9214382 A1 | | 9/1992 | |
| WO | WO-2015112035 A1 | | 7/2015 | |

OTHER PUBLICATIONS

Extended European Search Report for Application No. 22158134.1, dated Aug. 10, 2022, 15 pages including machine translation.

* cited by examiner

*Primary Examiner* — Patrick H Mackey
(74) *Attorney, Agent, or Firm* — MASCHOFF BRENNAN (57) ABSTRACT

A drug picking device is provided, the drug picking device having at least one shelf device and at least one movable shelf operating means for storing drug packs and for removing stored drug packs. The at least one shelf device has two vertical struts, a rear wall which is connected to the pair of vertical struts, two side wall elements which are each connected to an associated vertical strut, and at least one storage floor. The at least one storage floor has two corner portions having one of a rounded or beveled shape and that are supported by corresponding storage floor supports of the two vertical struts in such a way that the side edge of the at least one storage floor between the two corner portions is arranged to rest flush against the rear wall.

16 Claims, 4 Drawing Sheets

DRUG PICKING DEVICE

CROSS-REFERENCE TO RELATED APPLICATIONS

None

BACKGROUND

The disclosure relates to a drug picking device having at least one shelf device and at least one movable shelf operating means for storing drug packs and for removing stored drug packs.

SUMMARY

One or more embodiments having a drug picking device, including at least one shelf device and at least one movable shelf operating means for storing drug packs and for removing stored drug packs wherein the at least one shelf device includes at least one pair of vertical struts having two vertical struts, each of which is designed to extend in an elongated manner; a rear wall which is connected to the pair of vertical struts and on which the two vertical struts are arranged parallel to and at a distance from one another; at least one pair of side wall elements having two side wall elements which are each designed to be plate-shaped and which are each connected to an associated vertical strut, and at least one storage floor which has four side edges which run straight and which is arranged between the side wall elements; wherein each of the two vertical struts has a plurality of storage floor supports which are designed one behind the other in the longitudinal direction of the corresponding vertical strut, wherein each of the two side wall elements has a plurality of storage floor receptacles which are designed one behind the other in the longitudinal direction of the corresponding side wall element; wherein the at least one storage floor has two corner portions which are designed to run in a rounded or beveled manner, and wherein two oppositely arranged side edges of the at least one storage floor are arranged to be supported at least in portions on corresponding storage floor receptacles of the two side wall elements; and, wherein corresponding storage floor supports of the two vertical struts are designed to support the two corner portions of the at least one storage floor in a carrying manner, which corner portions are designed to run in a rounded or beveled manner.

The foregoing and other features, aspects and advantages of the disclosed embodiments will become more apparent from the following detailed description and accompanying drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Automated or at least partially automated drug picking devices are known from the prior art and are used in pharmacies in order to be able to store drug packs in a space-saving manner. The drug packs are stored in the known drug picking devices suitable for pharmacies in a chaotic or sorted manner, whereby an unnecessary empty volume due to the chaotic storage can be avoided and the number of stored drug packs can be increased considerably.

While the type of storage of the drug packs appears to be largely optimized, the structural design of the shelf device of a drug picking device offers space for optimizing the storage capacity. It is therefore the object of the present disclosure to provide a drug picking device in which the storage capacity is both optimized and increased.

This object is achieved according to the disclosure by a drug picking device with the features according to claim 1.

The drug picking device according to the disclosure has at least one shelf device and at least one movable shelf operating means for storing drug packs and for removing stored drug packs. The at least one shelf device comprises at least one pair of vertical struts having two vertical struts, each of which is designed to extend in an elongated manner, a rear wall which is connected to the pair of vertical struts and on which the two vertical struts are arranged parallel to and at a distance from one another, at least one pair of side wall elements having two side wall elements which are each designed plate-shaped and which are each connected (e.g., fixedly fastened or releasably fastened) to an associated vertical strut, and at least one storage floor which has four side edges which run straight and is arranged between the side wall elements. Each of the two vertical struts has a plurality of storage floor supports which are designed one behind the other in the longitudinal direction of the corresponding vertical strut, each of the two side wall elements having a plurality of storage floor receptacles which are designed one behind the other in the longitudinal direction of the corresponding side wall element. Furthermore, the at least one storage floor has two corner portions that are designed to run in a rounded or beveled manner. Two oppositely arranged side edges of the at least one storage floor are arranged to be supported at least in portions on corresponding storage floor receptacles of the two side wall elements, wherein corresponding storage floor supports of the two vertical struts are designed to support the two corner portions of the at least one storage floor in a carrying manner, which corner portions are designed to run in a rounded or beveled manner.

Advantageous and expedient embodiments and developments of the disclosure are disclosed in the corresponding dependent claims.

The disclosure provides a drug picking device which is distinguished by a simple construction. Due to the fact that corresponding storage floor supports of the two vertical struts support the two corner portions of the at least one storage floor in a carrying manner, which corner portions are designed to run in a rounded or beveled manner, in such a way that the side edge of the at least one storage floor, which side edge runs between the corner portions which run in a rounded or beveled manner, can be arranged in a very small distance from the rear wall, the space in a horizontal plane between the two vertical supports up to the rear wall is optimally used to store a maximum of drug packs, so that the storage capacity is advantageously increased compared to known drug picking devices.

An optimal use of space is provided in one or more embodiments of the disclosure in that the corresponding storage floor supports of the two vertical struts are designed to support the two corner portions of the at least one storage floor in a carrying manner, which corner portions are designed to run in a rounded or beveled manner, in such a way that the side edge of the at least one storage floor, which side edge runs between the corner portions which run in a rounded or beveled manner, is arranged to rest flush against the rear wall.

For optimal use of space, the disclosure also provides in one or more embodiments that a corresponding vertical strut is designed having a central portion to which a corresponding side wall element is fastened and from which a first support wing and a second support wing extend mirror-symmetrically to one another, and wherein the plurality of storage floor supports are designed on the first support wing and the second support wing. A corresponding vertical strut thus assumes a plurality of functions, a corresponding vertical strut being used, among other things, to fasten (e.g., fixedly fasten, releasably fasten) a side wall element, to support corner portions of the storage floor, and to attach the rear wall, and also contributes to the stability of the shelf device.

To increase the functionality of a corresponding vertical strut and thus for optimal use of space, a further embodiment of the disclosure provides that the first support wing and the second support wing each have a connection portion which is connected to the rear wall and a support portion which carries an associated corner portion of the storage floor, which corner portion is designed to run in a rounded or beveled manner.

In one or more embodiments of the disclosure, a compact arrangement in which the connection portion is designed to lie between the support portion and the central portion is particularly space-saving.

To connect a corresponding vertical strut to the rear wall, it is advantageous in a further embodiment of the disclosure if the connection portion is arranged to run parallel to the rear wall and rests against the rear wall, and the support portion extends at an acute angle relative to the connection portion in a direction pointing away from the rear wall.

For a space-saving arrangement and for optimum storage space, the disclosure provides in a further embodiment that the corresponding corner portion of the storage floor, which corner portion is designed to run in a beveled manner, extends at an acute angle relative to the side edge of the storage floor, which side edge lies between the two corner portions and is arranged to rest flush against the rear wall in a direction pointing away from the rear wall.

For the secure support of the storage floor, it is advantageous if the acute angle of a corresponding corner portion which is designed to run in a beveled manner is greater than the acute angle of a corresponding support portion.

To increase the compactness and optimal use of space, it is also provided in one or more embodiments of the disclosure that a corresponding storage floor support of the plurality of storage floor supports is designed as an incision in the corresponding support portion, and wherein the corner portion which is designed to run in a rounded or beveled manner is arranged in an inserted manner in the incision.

With regard to an optimal use of space and a further increase in compactness, the disclosure provides in one or more embodiments that a side edge of the corresponding side wall element is connected to an associated vertical strut, and a side edge of the corresponding side wall element, which side edge is opposite the associated vertical strut, is designed having a first bearing portion and a second bearing portion, wherein the first bearing portion and the second bearing portion extend from the corresponding side edge in opposite directions and parallel to the rear wall, and wherein the plurality of storage floor receptacles are designed as slots in the first bearing portion and the second bearing portion.

It also helps to increase the compactness if the storage floor is only supported at certain points, whereby the disclosure provides in a further embodiment that at least one portion of a first side edge of the storage floor, which portion extends from one of the corner portions which run in a rounded or beveled manner in a direction pointing away from the rear wall, is arranged to be supported in a bearing manner on the first bearing portion, and wherein at least one portion of a second side edge of the storage floor, which storage floor extends from the other of the corner portions which run in a rounded or beveled manner, in a direction pointing away from the rear wall, is arranged to be supported in a bearing manner on the second bearing portion.

The drug picking device according to the disclosure is advantageously of modular design, for which purpose a first row of shelves is provided in one or more embodiments of the disclosure, in which embodiment a plurality of shelf devices are arranged adjacently.

To ensure the stability of the first row of shelves, the disclosure provides in one or more embodiments that at least one longitudinal strut is provided which extends transversely to the vertical struts of the first row of shelves and which is connected (e.g., fixedly or releasably) to the vertical struts of the first row of shelves.

An additional possibility for modular expansion of the drug picking device is provided in one or more embodiments of the disclosure by a second row of shelves, in which second row of shelves a plurality of shelf devices are arranged adjacently and which is arranged opposite to the first row of shelves, wherein the first row of shelves and the second row of shelves are arranged at a distance from one another and form an alley for moving the shelf operating means movable in front of the first row of shelves and the second row of shelves.

To ensure the stability of the second row of shelves, it is also provided in one or more embodiments of the disclosure that at least one longitudinal strut is provided which extends transversely to the vertical struts of the second row of shelves and which is connected (e.g., fixedly connected, releasably connected) to the vertical struts of the second row of shelves.

To create a frame-like structure with high stability for two rows of shelves, the disclosure provides in one or more embodiments that at least one cross strut is provided, which cross strut connects (e.g., fixedly connects, releasably connects) one of the two vertical struts of the first row of shelves and one of the two vertical struts of the second row of shelves to one another.

Finally, the disclosure provides in one or more embodiments that a corresponding pair of side wall elements and a corresponding pair of vertical struts of two adjacently arranged shelf devices have a vertical strut used jointly by the two adjacently arranged shelf devices and a side wall element used jointly by the two adjacently arranged shelf devices. Thus, due to the use of a jointly used side wall element and a jointly used vertical strut, only three vertical struts and three side wall elements are required for two shelf devices arranged next to one another, whereby the number of components and thus the costs are advantageously reduced.

It is self-evident that the features mentioned above and yet to be described below can be used not only in the combination described but also in other combinations or in isolation without departing from the scope of the present disclosure. The scope of the disclosure is defined only by the claims.

Other specifics, features and advantages of the disclosure will emerge from the following description in context with the drawing, in which one or more embodiments of the disclosure is presented.

The foregoing and other features, aspects and advantages of the disclosed embodiments will become more apparent from the following detailed description and accompanying drawings.

Figure 1:
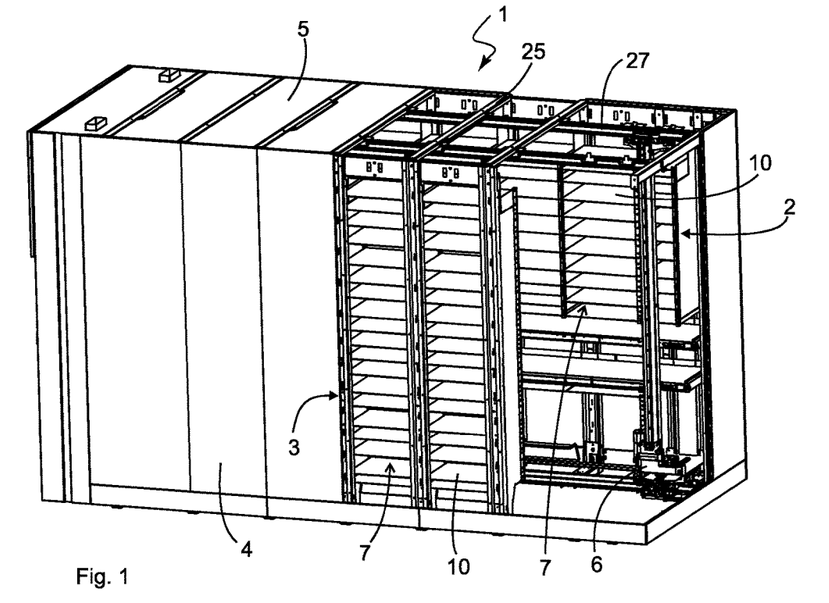
FIG. 1 is a perspective view of a drug picking device, according to the disclosure.

FIG. 1 shows a drug picking device 1 having a first row of shelves 2 and a second row of shelves 3, the second row of shelves 3 being arranged opposite to the first row of shelves 2 in the embodiment shown. The interior of the drug-picking device 1 is normally covered by a plurality of rear walls 4 and ceiling walls 5, some of the rear walls 4 and ceiling walls 5 being masked out in FIG. 1 in order to allow at least a partial view into the interior of the drug picking device 1. In front of the first row of shelves 2, a movable shelf operating means 6 is arranged, which shelf operating means 6 is designed for storing drug packs and for removing stored drug packs. The drug packs are either stored in the first and/or second row of shelves 2, 3 or are stored in the shelf operating means 6. The first row of shelves 2 and the second row of shelves 3 are arranged at a distance from one another in the illustrated embodiment and form an alley for moving the shelf operating means 6 movable in front of the first row of shelves 2 and the second row of shelves 3.

Even if two rows of shelves 2, 3 are shown in the illustrated embodiment, a drug picking device 1 can also have only a single row of shelves 2,3. In the embodiment shown, both the first row of shelves 2 and the second row of shelves 3 have a plurality of shelf devices 7 which are all constructed substantially identically. In the first row of shelves 2, a plurality of shelf devices 7 are arranged adjacently, a plurality of shelf devices 7 also being arranged next to one another in the second row of shelves 3. Even if a corresponding row of shelves 2, 3 has a plurality of shelf devices 7 in the embodiment shown, it should be noted that a row of shelves 2, 3 can also have only a single shelf device 7.

Figure 2:
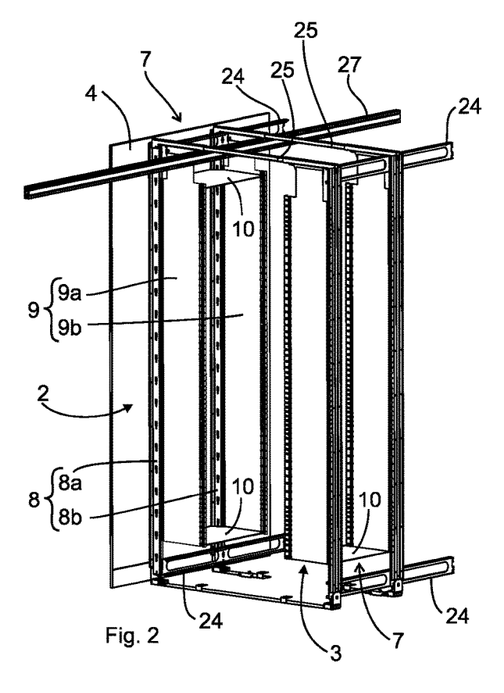
FIG. 2 is a perspective view of a shelf device, according to the disclosure.
Figure 3:
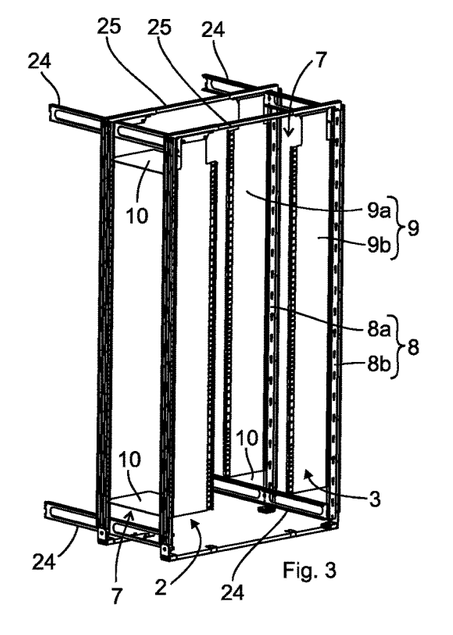
FIG. 3 is a further perspective view of the shelf device of FIG. 2, according to the disclosure.
Figure 4:
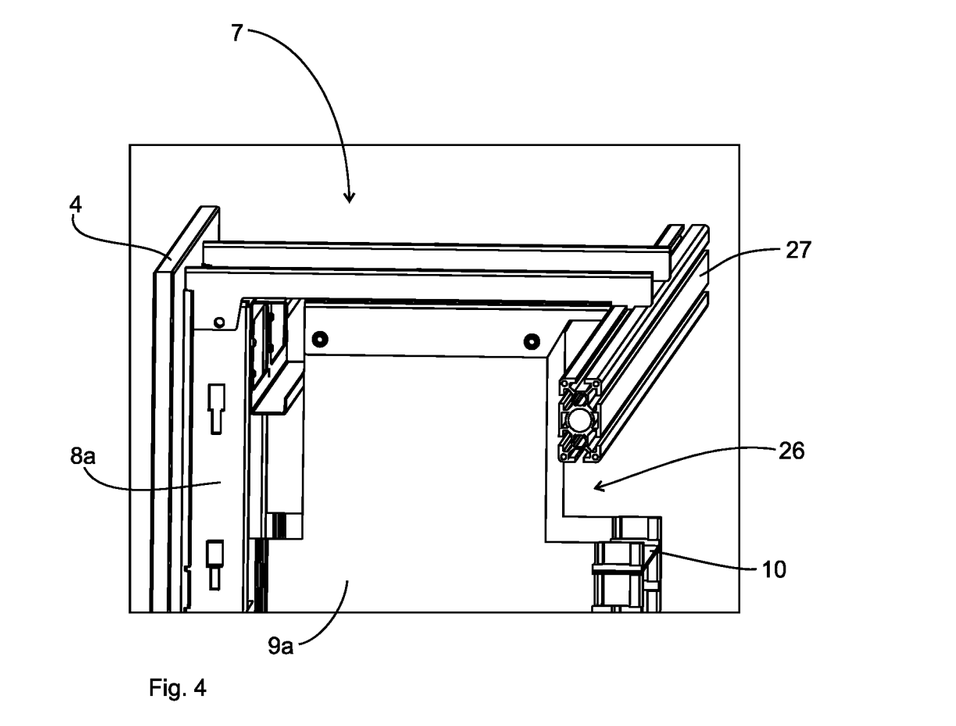
FIG. 4 is an enlarged illustration of a head region of the shelf device of FIG. 2, according to the disclosure.
Figure 5:
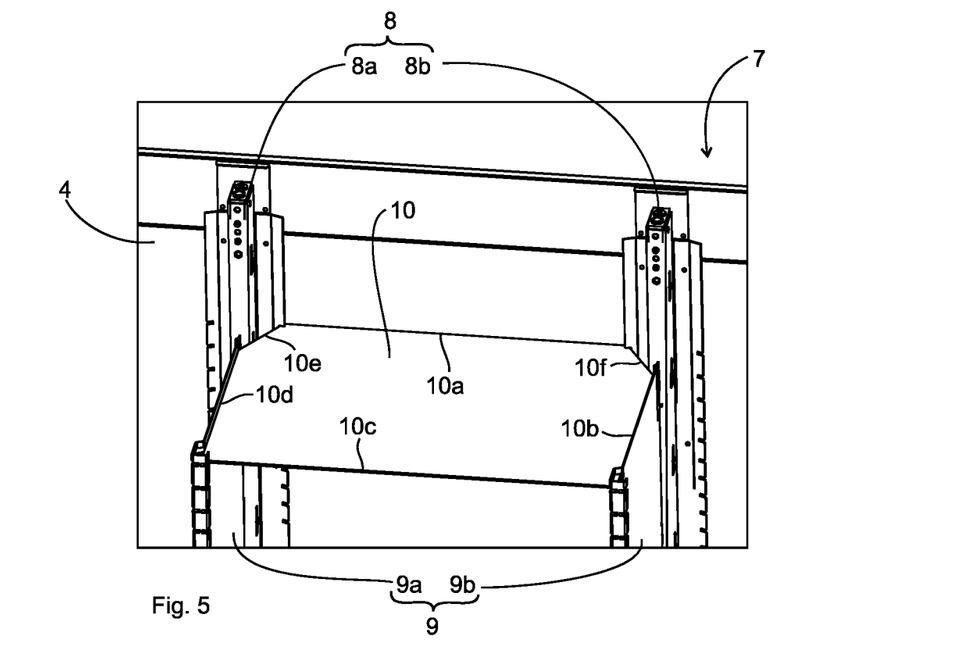
FIG. 5 is an enlarged perspective view of an upper region of the shelf device of FIG. 2, according to the disclosure.

FIGS. 2 to 11 show more details of a corresponding shelf device 7 of the drug picking device 1. FIGS. 2 and 3 show two shelf devices 7 arranged opposite to one another, one of the two shelf devices 7 belonging to the first row of shelves 2, whereas the other of the two shelf devices 7 belongs to the second row of shelves 3. For the sake of clarity, FIGS. 2 and 3 do not show any further shelf devices 7 in the rows of shelves 2 and 3. FIG. 5 is an enlarged perspective view of an upper region of a shelf device 7, all shelf devices 7 of a corresponding row of shelves 2, 3 of the drug picking device 1 being constructed substantially identically, so that only the features of a single shelf device 7 are described below. Looking at FIG. 5 and FIG. 6 together, showing a perspective view of individual parts of the shelf device 7, it can be seen that the shelf device 7 has a pair of vertical struts 8 (e.g., vertical struts 8a and 8b). The two vertical struts 8a and 8b are each designed to extend in an elongated manner, the vertical struts 8a and 8b being designed to be identical to one another in the embodiment shown, although this is not absolutely necessary.

Furthermore, the shelf device 7 has a pair of side wall elements 9 (e.g., side wall elements 9a and 9b). The side wall elements 9a and 9b delimit the shelf device 7 and ensure that stored drug packs cannot fall out of the shelf device 7 to the side. The side wall elements 9a and 9b are each designed to be plate-shaped and thin-walled and are each connected (e.g., fixedly or releasably) to an associated vertical strut 8a or 8b. In this context, "associated" means that the side wall element 9a is connected to the vertical strut 8a, whereas the side wall element 9b is connected to the vertical strut 8b. A rear wall 4 is also assigned to the shelf device 7, which rear wall 4 either covers only one shelf device 7 or a plurality of adjacently arranged shelf devices 7 relative to the outside. Correspondingly, the rear wall 4 is connected to the pair of vertical struts 8, the two vertical struts 8a and 8b being arranged in parallel on the rear wall 4 at a distance from one another. The rear wall 4 can be releasably connected to the pair of vertical struts 8, for example via a screw connection, it also being conceivable that, alternatively or additionally, the rear wall 4 is glued to the pair of vertical struts 8. The side wall elements 9a and 9b are each connected to the vertical strut 8a, 8b which is assigned to them on a side of the vertical struts 8a, 8b facing away from the rear wall 4.

Figure 6:
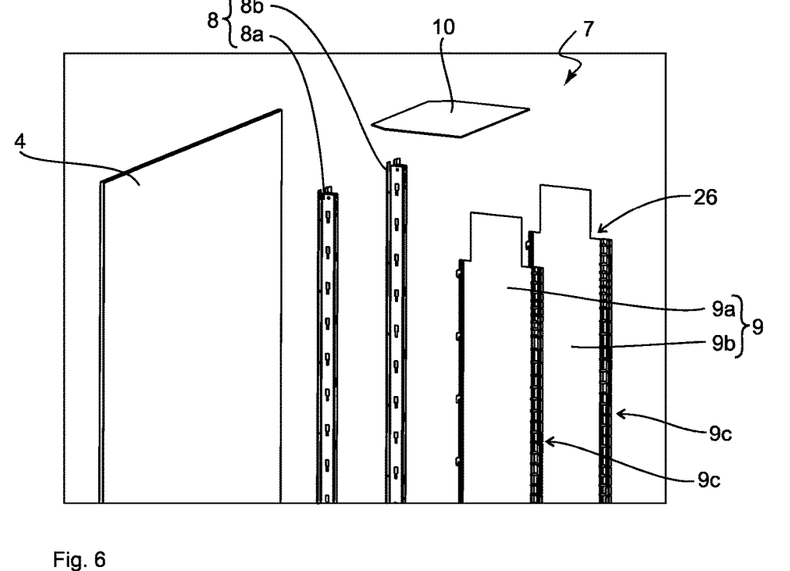
FIG. 6 is an exploded perspective view of individual parts of the shelf device of FIG. 2, according to the disclosure.

In the case of the present shelf device 7, the drug packs are stored on storage floors 10, only a single storage floor 10 being shown as an example in FIGS. 5 and 6. However, as can be seen from FIG. 1, a plurality of storage floors 10 can be provided for each row of shelves 2, 3, the storage floors 10 being arranged one above the other and being at a distance from one another. Such a storage floor 10 has four side edges 10a, 10b, 10c, 10d which run straight. As can be seen from FIGS. 5 and 7, the storage floor 10 is arranged between the two side wall elements 9a and 9b. The storage floor 10 is not only supported by the side wall elements 9a and 9b in this case. Rather, the storage floor 10 is supported both by the vertical struts 8a and 8b and by the side wall elements 9a and 9b. For this purpose, the vertical struts 8a and 8b each have a plurality of storage floor supports 8c (see FIG. 8), which are designed one behind the other in the longitudinal direction of the corresponding vertical strut 8a, 8b. Likewise, the two side wall elements 9a, 9b each have a plurality of storage floor receptacles 9c (see FIG. 6), which are designed one behind the other in the longitudinal direction of the corresponding side wall element 9a, 9b.

It is characteristic of the storage floor 10 of the shelf device 7 of the present disclosure that the storage floor 10 does not have four pointed corners, but that the storage floor 10 instead has two corner portions 10e and 10f (see FIG. 5), which are designed to run in a rounded or beveled manner. In the embodiment shown, the corner portions 10e, 10f are designed to run in a beveled manner, a rounded design of the corner portions also being conceivable as an alternative. As can also be seen from FIGS. 5 and 7, the two oppositely arranged side edges 10b and 10d of the storage floor 10 are arranged to be supported at least in portions on corresponding storage floor receptacles 9c of the two side wall elements 9a, 9b, the storage floor 10 in particular being stored in the region of the corner portions that are not rounded and not beveled. In contrast, the corresponding storage floor supports 8c of the two vertical struts 8a and 8b support the two corner portions 10e, 10f of the storage floor 10, which corner portions are designed to run in a beveled manner, in such a way that the side edge 10a of the storage floor 10 running between the corner portions 10e, 10f, which run in a beveled manner is arranged to rest flush against the rear wall 4, as can be seen in particular from FIG. 7. In this case, the storage floor supports 8c only support the corner portions 10e, 10f of the storage floor 10, which corner portions are designed to run in a beveled manner.

Looking at FIGS. 5 to 9 together, it can be seen that a corresponding vertical strut 8a, 8b is designed having a central portion 11. The central portion 11 is designed as a U-shaped hollow profile rail viewed in cross section. The central portion 11 is used to fasten (e.g., fixedly fasten, releasably fasten) one of the two side wall elements 9a, 9b, a plurality of receiving recesses 20 being designed for this purpose in the leg connecting the two legs of the U-shaped hollow profile rail, which receiving recesses 20 will be discussed in more detail later. A first support wing 12a and a second support wing 12b extend from the central portion 11. More precisely, the first support wing 12a extends from a free end of the two legs of the U-shaped profile rail, and the second support wing 12b extends from the other free end of the leg of the U-shaped profile rail. Furthermore, the first support wing 12a and the second support wing 12b extend mirror-symmetrically to one another in relation to a plane which runs perpendicular to the rear wall 4. The storage floor supports 8c are designed on the first support wing 12a and on the second support wing 12b.

The first support wing 12a has a connection portion 14, which connection portion is connected to the rear wall 4, and a support portion 15, which support portion 15 carries the associated corner portion 10e or 10f of the storage floor 10, which corner portion 10e, 10f is designed to run in a beveled manner. The second support wing 12b also comprises a connection portion 14 which is connected to the rear wall 4, and a support portion 15 which carries the associated corner portion 10e or 10f of the storage floor 10, which corner portion 10e, 10f is designed to run in a beveled manner. In both the first support wing 12a and the second support wing 12b, the connection portion 14 is designed to lie between the support portion 15 and the central portion 11. In this case, a corresponding support portion 15 extends obliquely in a direction pointing away from the connection portion 14 and in a direction pointing towards the central portion 11.

Figure 7:
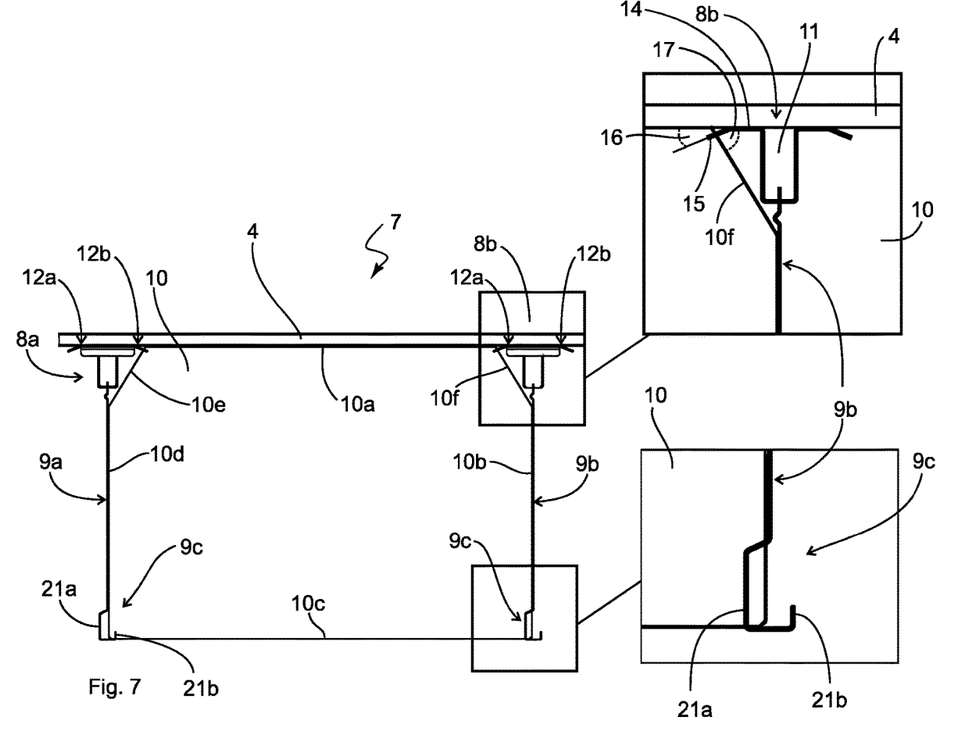
FIG. 7 is a plan view of the shelf device of FIG. 2 with two enlarged detailed illustrations, according to the disclosure.

In particular, it can be seen from FIG. 7 that the connection portion 14 is arranged to run parallel to the rear wall 4 and rests against the rear wall 4. In contrast, the support portion 15 extends at an acute angle 16 relative to the connection portion 14 in a direction pointing away from the rear wall 4. It can also be seen from FIG. 7 that the corresponding corner portion 10e or 10f of the storage floor 10, which corner portion 10e, 10f is designed to run in a beveled manner, extends at an acute angle 17 relative to the side edge 10a of the storage floor 10, which side edge 10a lies between the two corner portions 10e, 10f and is arranged to rest flush against the rear wall 4 in a direction pointing away from the rear wall 4. The acute angle 17 of a corresponding corner portion 10e, 10f, which is designed to run in a beveled manner, is larger than the acute angle 16 of a corresponding support portion 15.

Figure 8:
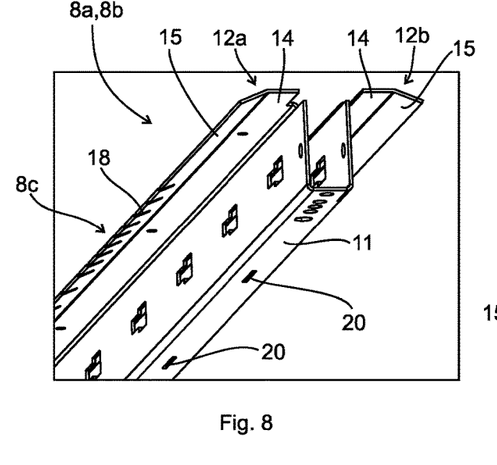
FIG. 8 is a perspective view of a vertical strut of the shelf device of FIG. 2, according to the disclosure.
Figure 9:
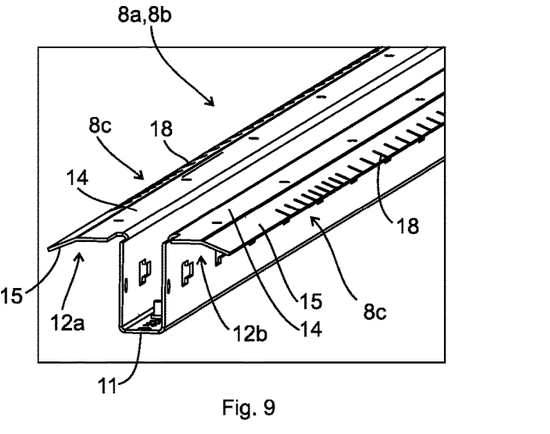
FIG. 9 is another perspective view of the vertical strut of FIG. 8, according to the disclosure.

As can be seen from FIGS. 8 and 9, the corresponding storage floor supports 8c are designed as an incision 18 in the corresponding support portion 15, so that the corner portion 10e or 10f, which corner portion 10e, 10f is designed to run in a beveled manner, is arranged in an inserted manner in the incision 18. The corner portions 10e, 10f of the storage floor 10, which corner portions 10e, 10f are designed to run in a beveled manner, together with the storage floor supports 8c, which storage floor supports are each configured as incision 18, and the alignment of the corresponding support portions 15, which alignment runs obliquely, allow the storage floor 10 to be easily pushed into the associated support portions 15, so that the storage floor 10 rests flush with its side edge 10a against the rear wall 4. In this case, the corner portions 10e, 10f, which are designed to run in a beveled manner, and the obliquely arranged support portions 15 equal a sufficient tolerance compensation so that the storage floor 10 is held securely and stably in a supported manner.

Figure 10:
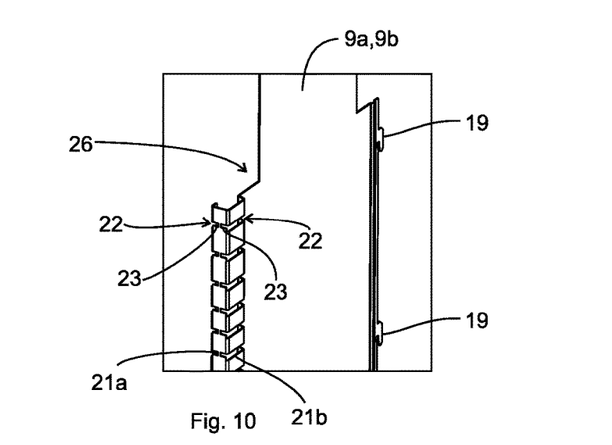
FIG. 10 is a perspective detailed view of a side wall element of the shelf device of FIG. 2, according to the disclosure.

As already mentioned above, a side edge of the corresponding side wall element 9a or 9b is connected to an associated vertical strut 8a or 8b. For this purpose, a plurality of suspension hooks 19 arranged at a distance from one another are designed on the side edge of the corresponding side wall element 9a, 9b. These suspension hooks 19, which can be seen for example from FIG. 10, are inserted into associated receiving recesses 20 (see, for example, FIG. 8), which receiving recesses 20 are formed on the central portion 11 of a corresponding vertical strut 8a, 8b when the side wall elements 9a, 9b are assembled. To support the storage floor 10, a side edge of the corresponding side wall element 9a, 9b, which side edge is opposite the associated vertical strut 8a, 8b, is designed having a first bearing portion 21a and a second bearing portion 21b. The first bearing portion 21a and the second bearing portion 21b extend from the corresponding side edge of the corresponding side wall element 9a, 9b in opposite directions and parallel to the rear wall 4, as shown for example in FIG. 7. The bearing portions 21a, 21b are designed in the region of the corners of the side edges 10b and 10c or 10d and 10c.

With reference to FIG. 7, the bearing portion 21b of the side wall element 9a supports a portion of the side edge 10d and the bearing portion 21a of the side wall element 9b supports a portion of the side edge 10b, whereas the bearing portion 21a of the side wall element 9a and the bearing portion 21b of the side wall element 9b do not support any portions of any side edges 10a, 10b, 10c, 10d of the storage floor 10. Rather, the bearing portion 21a of the side wall element 9a and the bearing portion 21b of the side wall element 9b serve to support portions of storage floors 10 of adjacent rows of shelves 2, 3.

Figure 11:
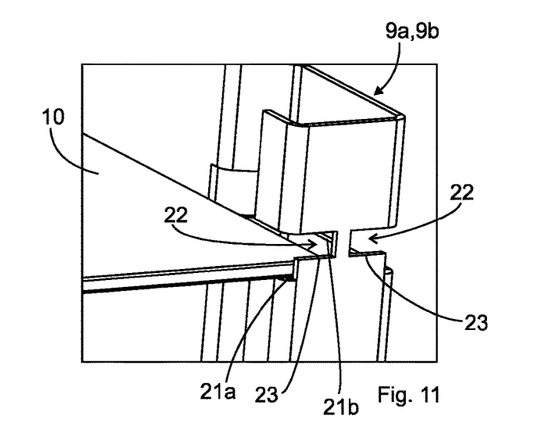
FIG. 11 is a further perspective detailed view of the side wall element of FIG. 10 having a storage floor supported thereon, according to the disclosure.
Figure 12:
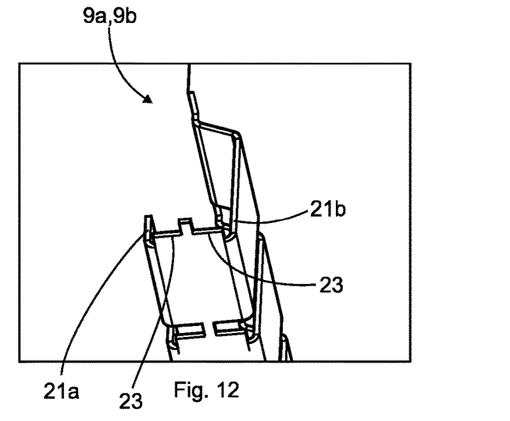
FIG. 12 is a sectional detailed view of the side wall element of FIG. 10, according to the disclosure.

As can be seen, for example, from FIGS. 10 and 11, the storage floor receptacles 9c are designed as slots 22 in the first bearing portion 21a and the second bearing portion 21b. Consequently, at least one portion of the side edge 10b of the storage floor 10, which portion extends from the corner portion 10f which runs in a beveled manner in a direction pointing away from the rear wall 4, is arranged to be supported in a bearing manner on the first bearing portion 21a, whereas at least one portion of the side edge 10d of the storage floor 10, which side edge extends from the other corner portion 10e which runs in a beveled manner in a direction pointing away from the rear wall 4, is arranged to be supported in a bearing manner on the second bearing portion 21b.

From the embodiments above, it can be seen that when only one row of shelves is used, one of the two bearing portions 21a or 21b of a side wall element 9a or 9b is not used. Both bearing portions 21a or 21b of a side wall element 9a or 9b are used when a plurality of shelf devices 7 are arranged next to one another and form a row of shelves 2, 3. Correspondingly, a corresponding pair of side wall elements 9 and a corresponding pair of vertical struts 8 of two adjacently arranged shelf devices 7 have a vertical strut 8a or 8b used jointly by the two adjacently arranged shelf devices 7 and a side wall element 9a or 9b used jointly by the two adjacently arranged shelf devices 7.

In order to prevent the storage floor 10 from moving out of its supported position in a direction pointing away from the rear wall 4, a retaining projection 23 is designed on the storage floor receptacles 9c in addition to the slot 22, as can be seen in FIG. 11. At one end of a corresponding slot 22, the retaining projection 23 is designed to prevent movement of the storage floor 10 in a direction pointing away from the rear wall 4.

From FIGS. 2 and 3, it can also be seen that a longitudinal strut 24 is provided for a shelf device 7, which longitudinal strut 24 extends transversely to the vertical struts 8a, 8b of a pair of vertical struts 8 and which is connected to the vertical struts 8a, 8b. Two longitudinal struts 24 are provided for the two rows of shelves 2 and 3 in FIGS. 2 and 3, the longitudinal struts 24 of the first row of shelves 2 and the second row of shelves 3 being arranged both close to the floor and close to the ceiling. Each longitudinal strut 24 can extend at least over the region of a shelf device 7, the longitudinal strut 24 preferably extending over more than one shelf device 7. Consequently, at least one longitudinal strut 24 is provided which extends transversely to the vertical struts 8a, 8b of the first row of shelves 2 and which is connected to the vertical struts 8a, 8b of the first row of shelves 2. Likewise, at least one longitudinal strut 24 is provided, which longitudinal strut 24 extends transversely to the vertical struts 8a, 8b of the second row of shelves 3 and which is connected to the vertical struts 8a, 8b of the second row of shelves 3. The longitudinal strut 24 ensures an increase in the stability of a corresponding shelf device 7.

A cross strut 25 contributes to further increasing the stability of two opposing rows of shelves 2, 3, as can be seen from FIGS. 2 to 4. At least one cross strut 25 connects one of the two vertical struts 8a, 8b of the first row of shelves 2 and one of the two vertical struts 8a, 8b of the second row of shelves 3. It is particularly advantageous if two cross struts 25 are provided, one of the two cross struts 25 being arranged near the floor or even supporting the vertical strut 8a, 8b with respect to the floor, and the other of the two cross struts 25 being arranged near the ceiling and thereby providing a support for the ceiling walls 5.

It can also be seen from FIGS. 2 to 4 that the side wall elements 9a, 9b are provided with a straight bulge 26 at one longitudinal end. The bulge 26 provides space for a movement rail 27 on which the shelf operating means 6 can move within the drug picking device 1 and in front of a shelf device 7.

In one or more embodiments, a drug picking device comprises at least one shelf device; and at least one movable shelf operating means for storing drug packs and for removing stored drug packs. The at least one shelf device comprises: at least one pair of vertical struts having two vertical struts, each extending in an elongated manner; a rear wall connected to the pair of vertical struts and on which the two vertical struts are arranged parallel to and at a distance from one another; at least one pair of side wall elements having two plate-shaped side wall elements each connected to an associated vertical strut; and at least one storage floor having four straight side edges and which is arranged between the side wall elements. Each of the two vertical struts has a plurality of storage floor supports arranged one behind the other in a longitudinal direction of a corresponding vertical strut. Each of the two side wall elements has a plurality of storage floor receptacles arranged one behind the other in the longitudinal direction of a corresponding side wall element. The at least one storage floor has two corner portions having one of a rounded shape and a beveled shape, wherein two oppositely arranged side edges of the at least one storage floor are arranged to be supported at least in portions on corresponding storage floor receptacles of the two side wall elements, and wherein corresponding storage floor supports of the two vertical struts are designed to support the two corner portions of the at least one storage floor in a carrying manner.

In aspects of the disclosure, a rear side edge of the at least one storage floor runs between the two corner portions and is arranged to rest flush against the rear wall. In aspects of the disclosure, the corresponding vertical strut has a central portion to which a corresponding side wall element is fastened and from which a first support wing and a second support wing extend mirror-symmetrically to one another, and wherein the plurality of storage floor supports are arranged on the first support wing and the second support wing. In aspects of the disclosure, the first support wing and the second support wing each have a connection portion which is connected to the rear wall and a support portion which has a corresponding corner portion of the storage floor. In aspects of the disclosure, the connection portion is designed to lie between the support portion and the central portion. In aspects of the disclosure, the connection portion is arranged to run parallel to the rear wall and rests against the rear wall, and wherein the support portion extends at an acute angle relative to the connection portion in a direction pointing away from the rear wall.

In aspects of the disclosure, the corresponding corner portion of the storage floor is beveled shape and extends at an acute angle relative to the side edge of the storage floor, which side edge lies between the two corner portions and is arranged to rest flush against the rear wall in a direction pointing away from the rear wall. In aspects of the disclosure, the acute angle of the beveled shape corresponding corner portion is greater than the acute angle of a corresponding support portion. In aspects of the disclosure, a corresponding storage floor support of the plurality of storage floor supports is designed as an incision in the corresponding support portion, and wherein the corner portion is inserted in the incision. In aspects of the disclosure, one side edge of the corresponding side wall element is connected to an associated vertical strut, and a side edge of the corresponding side wall element, which side edge is opposite the associated vertical strut, has a first bearing portion and a second bearing portion, wherein the first bearing portion and the second bearing portion extend from the corresponding side edge in opposite directions and parallel to the rear wall, and wherein the plurality of storage floor receptacles are slots in the first bearing portion and the second bearing portion.

In aspects of the disclosure, at least one portion of a first side edge of the storage floor extends from one of the corner portions in a direction pointing away from the rear wall and is arranged to be supported in a bearing manner on the first bearing portion, and wherein at least one portion of a second side edge of the storage floor extends from the other of the corner portions in a direction pointing away from the rear wall and is arranged to be supported in a bearing manner on the second bearing portion. In aspects of the disclosure, a first row of shelves in which a plurality of shelf devices are arranged adjacently. In aspects of the disclosure, at least one longitudinal strut is provided which extends transversely to the vertical struts of the first row of shelves and which is connected to the vertical struts of the first row of shelves. In aspects of the disclosure, a second row of shelves, in which a plurality of shelf devices are arranged adjacently and which is arranged opposite to the first row of shelves, wherein the first row of shelves and the second row of shelves are arranged at a distance from one another and form an alley for moving the shelf operating means which is movable in front of the first row of shelves and the second row of shelves.

In aspects of the disclosure, at least one cross strut is provided, which cross strut connects one of the two vertical struts of the first row of shelves and one of the two vertical struts of the second row of shelves to one another. In aspects of the disclosure, a corresponding pair of side wall elements and a corresponding pair of vertical struts of two adjacently arranged shelf devices have a vertical strut used jointly by the two adjacently arranged shelf devices and a side wall element used jointly by the two adjacently arranged shelf devices.

In one or more embodiments, a drug picking device comprises a movable operating device configured for storing drug packs and for removing stored drug packs; and a shelf device. The shelf device comprises: a first vertical strut having a plurality of first storage floor supports disposed along an axial length of the first vertical strut; a second vertical strut having a plurality of second storage floor supports disposed along an axial length of the second vertical strut; a rear wall coupled to the first and second vertical struts, wherein the first and second vertical struts are disposed parallel to one another; a first side wall element coupled to the first vertical strut and having a plurality of first storage floor receptacles disposed along an axial length of the first side wall element; a second side wall element coupled to the second vertical strut and having a plurality of second storage floor receptacles disposed along an axial length of the second side wall element; and a storage floor disposed between the first and second side wall elements. The storage floor comprises: first and second opposing straight side edges configured to be supported by one of the first and second storage floor receptacles, respectively; and first and second corner portions having one of a beveled shape and a rounded shape, and configured to be supported by one of the first and second storage floor supports, respectively.

In aspects of the disclosure, a third straight side edge of the storage floor extends between the first and second corner portions and is disposed flush against the rear wall. In aspects of the disclosure, the first and second side wall elements are coupled to a central portion of each of the first and second vertical struts, respectively, wherein a first support wing and a second support wing extend mirror-symmetrically to one another from the central portion, and wherein the plurality of first and second storage floor supports are respectively disposed on the first and second support wings. In aspects of the disclosure, the first support wing and the second support wing each have a connection portion coupled to the rear wall and a support portion configured to receive one of the first and second corner portions of the storage floor.

Of course, the disclosure described above is not limited to the described and illustrated embodiment. It can be seen that numerous modifications can be made to the embodiment depicted in the drawing, which are obvious to a person skilled in the art according to the intended application, without leaving the scope of the disclosure. The disclosure includes everything that is contained in the description and/or shown in the drawing, including anything that, deviating from the specific embodiment, is obvious to a person skilled in the art.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

LIST OF REFERENCE SIGNS

1 Drug picking device
2 First row of shelves
3 Second row of shelves
4 Rear walls
5 Ceiling walls
6 Shelf operating means
7 Shelf device
8 Pair of vertical struts
8a, 8b Vertical struts
8c Storage floor supports
9 Pair of side wall elements
9a, 9b Side wall element
9c Storage floor receptacles
10 Storage floor
10a, 10b 10c, 10d Side edges
10e, 10f Rounded or beveled corners
11 Central portion
12a, 12b First and second support wing
14 Connection portion
15 Support portion
16 Acute angle of support portion
17 Acute angle of corners
18 Incision as a storage floor support
19 Suspension hook
20 Receiving recesses
21a, 21b First and second bearing portion
22 Slots
23 Retaining projection
24 Longitudinal strut
25 Cross strut
26 Straight bulge
27 Movement rail

What is claimed:
1. A drug picking device, comprising:
at least one shelf device; and
at least one movable shelf operating means for storing drug packs and for removing stored drug packs, wherein the at least one shelf device comprises:
at least one pair of vertical struts having two vertical struts, each extending in an elongated manner;
a rear wall connected to the pair of vertical struts and on which the two vertical struts are arranged parallel to and at a distance from one another;
at least one pair of side wall elements having two plate-shaped side wall elements each connected to an associated vertical strut; and
at least one storage floor having four straight side edges and which is arranged between the side wall elements, wherein each of the two vertical struts has a plurality of storage floor supports arranged one behind the other in a longitudinal direction of a corresponding vertical strut, wherein each of the two side wall elements has a plurality of storage floor receptacles arranged one behind the other in the longitudinal direction of a corresponding side wall element, wherein the at least one storage floor has two corner portions having one of a rounded shape and a beveled shape, wherein two oppositely arranged side edges of the at least one storage floor are arranged to be supported at least in portions on corresponding storage floor receptacles of the two side wall elements, wherein corresponding storage floor supports of the two vertical struts are designed to support the two corner portions of the at least one storage floor in a carrying manner, wherein the corresponding vertical strut has a central portion to which a corresponding side wall element is fastened and from which a first support wing and a second support wing extend mirror-symmetrically to one another, and wherein the plurality of storage floor supports are arranged on the first support wing and the second support wing, wherein the first support wing and the second support wing each have a connection portion which is connected to the rear wall and a support portion which has a corresponding corner portion of the storage floor, and wherein the connection portion is arranged to run parallel to the rear wall and rests against the rear wall, and wherein the support portion extends at an acute angle relative to the connection portion in a direction pointing away from the rear wall.

2. The drug picking device of claim 1, wherein a rear side edge of the at least one storage floor runs between the two corner portions and is arranged to rest flush against the rear wall.

3. The drug picking device of claim 1, wherein the connection portion is designed to lie between the support portion and the central portion.

4. The drug picking device of claim 1, wherein the corresponding corner portion of the storage floor is beveled shape and extends at an acute angle relative to the side edge of the storage floor, which side edge lies between the two corner portions and is arranged to rest flush against the rear wall in a direction pointing away from the rear wall.

5. The drug picking device of claim 4, wherein the acute angle of the beveled shape corresponding corner portion is greater than the acute angle of a corresponding support portion.

6. The drug picking device of claim 1, wherein a corresponding storage floor support of the plurality of storage floor supports is designed as an incision in the corresponding support portion, and wherein the corner portion is inserted in the incision.

7. The drug picking device of claim 1, wherein one side edge of the corresponding side wall element is connected to an associated vertical strut, and a side edge of the corresponding side wall element, which side edge is opposite the associated vertical strut, has a first bearing portion and a second bearing portion, wherein the first bearing portion and the second bearing portion extend from the corresponding side edge in opposite directions and parallel to the rear wall, and wherein the plurality of storage floor receptacles are slots in the first bearing portion and the second bearing portion.

8. The drug picking device of claim 7, wherein at least one portion of a first side edge of the storage floor extends from one of the corner portions in a direction pointing away from the rear wall and is arranged to be supported in a bearing manner on the first bearing portion, and wherein at least one portion of a second side edge of the storage floor extends from the other of the corner portions in a direction pointing away from the rear wall and is arranged to be supported in a bearing manner on the second bearing portion.

9. The drug picking device of claim 1, comprising a first row of shelves in which a plurality of shelf devices are arranged adjacently.

10. The drug picking device of claim 9, wherein at least one longitudinal strut is provided which extends transversely to the vertical struts of the first row of shelves and which is connected to the vertical struts of the first row of shelves.

11. The drug picking device of claim 9, comprising a second row of shelves, in which a plurality of shelf devices are arranged adjacently and which is arranged opposite to the first row of shelves, wherein the first row of shelves and the second row of shelves are arranged at a distance from one another and form an alley for moving the shelf operating means which is movable in front of the first row of shelves and the second row of shelves.

12. The drug picking device of claim 11, wherein at least one cross strut is provided, which cross strut connects one of the two vertical struts of the first row of shelves and one of the two vertical struts of the second row of shelves to one another.

13. The drug picking device of claim 9, wherein a corresponding pair of side wall elements and a corresponding pair of vertical struts of two adjacently arranged shelf devices have a vertical strut used jointly by the two adjacently arranged shelf devices and a side wall element used jointly by the two adjacently arranged shelf devices.

14. A drug picking device, comprising:
a movable operating device configured for storing drug packs and for removing stored drug packs; and
a shelf device, comprising:
a first vertical strut having a plurality of first storage floor supports disposed along an axial length of the first vertical strut;
a second vertical strut having a plurality of second storage floor supports disposed along an axial length of the second vertical strut;
a rear wall coupled to the first and second vertical struts, wherein the first and second vertical struts are disposed parallel to one another;
a first side wall element coupled to the first vertical strut and having a plurality of first storage floor receptacles disposed along an axial length of the first side wall element;
a second side wall element coupled to the second vertical strut and having a plurality of second storage floor receptacles disposed along an axial length of the second side wall element; and
a storage floor disposed between the first and second side wall elements and comprising:
first and second opposing straight side edges configured to be supported by one of the first and second storage floor receptacles, respectively; and
first and second corner portions having one of a beveled shape and a rounded shape, and configured to be supported by one of the first and second storage floor supports, respectively, wherein a first support wing and a second support wing each have a connection portion coupled to the rear wall and a support portion configured to receive one of the first and second corner portions of the storage floor, and wherein the connection portion is arranged to run parallel to the rear wall and rests against the rear wall, and wherein the support portion extends at an acute angle relative to the connection portion in a direction pointing away from the rear wall.

15. The drug picking device of claim 14, wherein a third straight side edge of the storage floor extends between the first and second corner portions and is disposed flush against the rear wall.

16. The drug picking device of claim 14, wherein the first and second side wall elements are coupled to a central portion of each of the first and second vertical struts, respectively, wherein the first support wing and the second support wing extend mirror-symmetrically to one another from the central portion, and wherein the first and second storage floor supports are respectively disposed on the first and second support wings.

* * * * *